US009469887B2

(12) United States Patent
Dring

(10) Patent No.: US 9,469,887 B2
(45) Date of Patent: Oct. 18, 2016

(54) METHOD FOR PRODUCTION OF TITANIUM WELDING WIRE

(75) Inventor: Kevin Dring, Porsgrunn (NO)

(73) Assignee: NORSK TITANIUM AS, Hønefoss (NO)

( * ) Notice: Subject to any disclaimer, the term of this patent is extended or adjusted under 35 U.S.C. 154(b) by 1095 days.

(21) Appl. No.: 13/503,487

(22) PCT Filed: Oct. 21, 2010

(86) PCT No.: PCT/NO2010/000374
§ 371 (c)(1),
(2), (4) Date: Jul. 13, 2012

(87) PCT Pub. No.: WO2011/049465
PCT Pub. Date: Apr. 28, 2011

(65) Prior Publication Data
US 2012/0269671 A1    Oct. 25, 2012

(30) Foreign Application Priority Data
Oct. 23, 2009    (GB) .................................... 0918677.6

(51) Int. Cl.
*B22F 5/12*        (2006.01)
*C22C 14/00*       (2006.01)
*B21C 23/00*       (2006.01)
*B21C 23/08*       (2006.01)
*B21C 37/04*       (2006.01)
*B22F 5/00*        (2006.01)
(Continued)

(52) U.S. Cl.
CPC ............. *C22C 14/00* (2013.01); *B21C 23/002* (2013.01); *B21C 23/08* (2013.01); *B21C 37/04* (2013.01); *B22F 5/006* (2013.01); *B23K 35/0261* (2013.01); *B23K 35/325* (2013.01); *B23K 35/40* (2013.01); *C22F 1/183* (2013.01); *B22F 2998/10* (2013.01)

(58) Field of Classification Search
CPC .................................. B22F 5/006; B22F 5/12
USPC ........................................................ 419/27, 28
See application file for complete search history.

(56) References Cited

U.S. PATENT DOCUMENTS

| 2,967,613 A | 1/1961 | Ellis et al. |
| 3,052,976 A | 9/1962 | Rennhack |

(Continued)

FOREIGN PATENT DOCUMENTS

| EP | 1 375 690 | 1/2004 |
| JP | 60-033308 | 2/1985 |

(Continued)

OTHER PUBLICATIONS

B.L. Ferguson and R.M. German, Powder Shaping and Consolidation Technologies,Shaping and Consolidation Technologies, vol. 7, Powder Metal Technologies and Applications, ASM International, 1998, p. 313-320.*

(Continued)

*Primary Examiner* — Jessee Roe
*Assistant Examiner* — Anthony Liang
(74) *Attorney, Agent, or Firm* — Dentons US LLP

(57) ABSTRACT

A process for producing a weldable titanium or titanium alloy wire characterized in that full consolidation of the wire is achieved via solid-state processing entailing compaction, extrusion, and rolling, whereby melting of the constituent titanium sponge particles does not occur.

18 Claims, 2 Drawing Sheets

Figure 1:
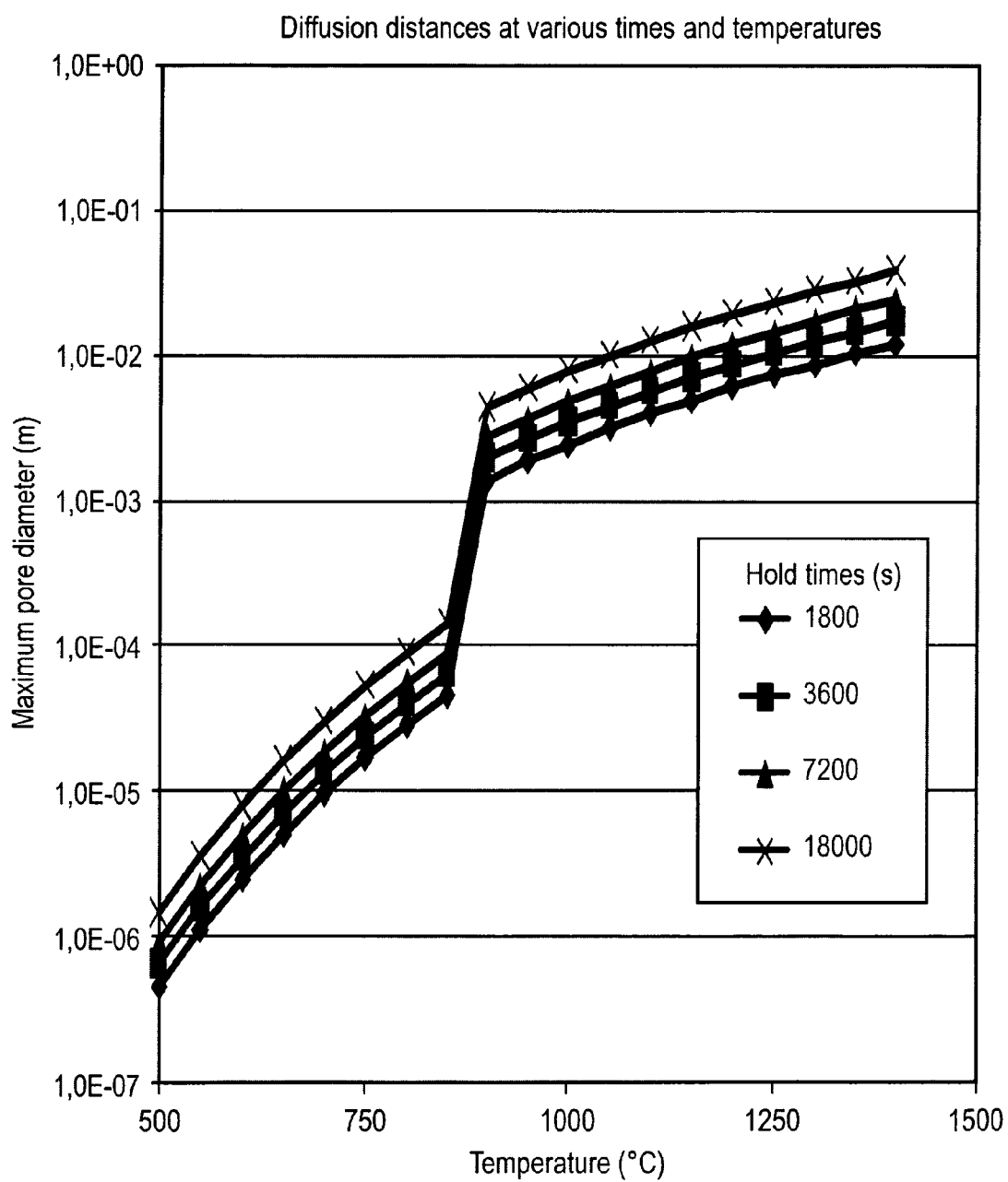

(51) Int. Cl.
    *B23K 35/02*    (2006.01)
    *B23K 35/32*    (2006.01)
    *B23K 35/40*    (2006.01)
    *C22F 1/18*     (2006.01)

(56) References Cited

U.S. PATENT DOCUMENTS

| | | | |
|---|---|---|---|
| 4,999,336 | A | 3/1991 | Nadkarni et al. |
| 6,582,833 | B2 | 6/2003 | Toyoda et al. |
| 6,635,098 | B2 | 10/2003 | Abkowitz et al. |
| 2004/0115083 | A1* | 6/2004 | Furuta .................. C22C 14/00 419/28 |
| 2006/0185473 | A1 | 8/2006 | Withers et al. |

FOREIGN PATENT DOCUMENTS

| | | |
|---|---|---|
| JP | 61-086094 | 5/1986 |
| JP | 63-262431 | 10/1988 |
| JP | 62-029407 | 3/1997 |
| JP | 2001-131609 | 5/2001 |
| RU | 2 090 310 | 9/1997 |
| SU | 1038068 | 8/1983 |
| WO | 2007/084144 | 7/2007 |

OTHER PUBLICATIONS

Forging Machinery, Dies, and Processes, Metals Handbook Desk Edition, ASM International, 1998, p. 839-863.*
Donachie, Matthew J. "Cleaning and Finishing." Titanium: A Technical Guide. 2nd ed. Materials Park, OH: ASM International, 2000. 85-93.*
"Titanium Processing". Encyclopædia Britannica. Encyclopædia Britannica Online. Encyclopædia Britannica Inc., 2015. Web. Nov. 20, 2015.*
Cubberly, William H., and Ramón Bakerjian. "Special PM Processes." Tool and Manufacturing Engineers Handbook. Dearborn: Society of Manufacturing Engineers, 1989. 39.*
Swift, K. G., and J. D. Booker. "Rolling." Process Selection: From Design to Manufacture. 2nd ed. Oxford: Butterworth-Heinemann, 2003. 94-95.*
International Search Report issued Feb. 4, 2011 in International (PCT) Application No. PCT/NO2010/000374, of which the present application is the national stage.
International Preliminary Report on Patentability issued Feb. 16, 2012 in International (PCT) Application No. PCT/NO2010/000374, of which the present application is the national stage.
Great Britain Search Report issued Nov. 25, 2009 in corresponding British Application No. 0918677.6.

* cited by examiner a)            b)

METHOD FOR PRODUCTION OF TITANIUM WELDING WIRE

TECHNICAL FIELD

This invention relates to a method for producing a weldable titanium wire by cold compaction, extrusion and rolling titanium sponge characterised in that consolidation and forming is performed wholly in the solid state without melting or encapsulation of the titanium sponge particles.

INTRODUCTION

Titanium and its alloys exhibit excellent mechanical properties and unrivalled corrosion resistance. Titanium metal is currently produced by the Kroll process (U.S. Pat. No. 2,205,854), whereby titanium tetrachloride ($TiCl_4$) is reacted with molten magnesium metal within a large steel retort. A spongy mass of porous titanium—known as "sponge"—remains in the retort after subsequent vacuum distillation at 1000° C. to drive off the excess magnesium and magnesium chloride by-product. The sponge mass must be forcibly removed since the titanium adheres to the retort walls. The sponge is subsequently sheared and crushed, followed by sieving to obtain a desired size fraction typically between 3 and 25 mm.

These sponge particles are blended with alloying additions, such as Al, V, Fe, $TiO_2$, Mo, Cr, etc., to obtain a titanium alloy mixture. These blends are melted by an electron beam, plasma torch, or under vacuum arc to produce large ingots up to 1.5 m in diameter and weighing up to 25 tonnes. This processing step is both capital intensive and due to segregation during solidification, many elements must be kept within strictly controlled limits. The ingots are heated to high temperatures where they are typically forged and rolled in several processing operations to refine the microstructure and reduce the cross-sectional area to intermediate product forms such as billets, bars and plate. The costs associated with producing a 25.4 mm (1") thick Ti plate was analysed with nearly 40% accounted for by the sponge raw material, but 60% in the subsequent melting and mill operations.

The high cost of producing finished titanium components often results from the practice of extensively machining these mill products to a complex final geometry. Additive manufacturing techniques minimise machining waste by sequentially building a complex component from a simple feed material, such as titanium powder or welding wire. The cost of powder feedstock is prohibitive for all but the most exotic of applications, owing to the difficulties in handling a finely divided reactive material and consequent oxygen contamination. Thus titanium wire has received significant attention as the more promising feedstock.

To produce conventional titanium wire, the bar stock produced in the above manner is typically rolled to a diameter less than 10 mm and drawn to final size, which for automated welding applications is typically 1 to 3 mm. Taking into account yield losses during subsequent handling, the cost increase in converting Ti sponge to bar and subsequently a weldable wire represents the majority of the total cost of wire production.

Alternative methods of producing a weldable titanium final produced through solid state processing (without intermediate melting) of titanium sponge have not overcome the problems of feeding the irregularly-shaped and porous sponge particulates. Consequently, non-melt processing has required replacing the readily available Kroll titanium sponge with other titanium particulates.

U.S. Pat. No. 7,311,873 discloses a method for production of plate from fine powder or particles from the Hunter process (sodium reduction of $TiCl_4$), although the production costs of both titanium powders and the Hunter process are inferior to the Kroll process and, for the latter, only 4% of the titanium sponge is of the appropriate powder size and shape.

Electrolytically produced titanium had been produced by DuPont [1], which was subsequently rolled to plate. The dendritic nature of the electrowon product resulted in high salt entrainment, which rendered the material non-weldable and gave poor mechanical properties.

More recently, hydrogenation of titanium sponge has been investigated as a simple means to produce titanium powders. Although the starting material is ductile Kroll sponge, the resulting titanium hydride is a brittle material that can easily be crushed to the desired particle size. Titanium hydride has been successfully compacted and, after high temperature vacuum sintering to densify and drive off the hydrogen from the titanium, a billet that can be subsequently worked in the same manner as conventional titanium is produced [2]. The process of vacuum sintering is cost prohibitive and the residual hydrogen contamination, grain growth at temperature and oxygen pickup limit broader use.

The direct extrusion of HDH (hydride/dehydride) titanium was found to produce a near 100% dense product [3], while eliminating the need for hot isostatic pressing that is typically required for titanium powder metallurgy components. However, two precompaction processes were required, one of which was cold-isostatic pressing, which raises issues regarding the scaleability of such a process, in addition to the high-oxygen contents of the starting material.

As illustrated above, attempts to use alternative feedstocks are hampered by the limited availability and higher costs of these materials, and the unacceptable properties of the final products.

Consequently, the intrinsic benefits of additive manufacturing processes are nullified by the absence of a low-cost feed material.

OBJECTIVE OF THE INVENTION

The main objective of the invention is to provide a method for producing titanium or alloyed titanium wire feedstock in a manner requiring substantially fewer processing steps and giving greater flexibility in final wire composition.

A further objective of the invention is to provide a method for producing weldable titanium or alloyed titanium wire that, when melted and built into a component using additive manufacturing, exhibits a chemical composition and mechanical properties comparable to conventional weld wire.

DESCRIPTION OF THE INVENTION

The present invention is based on the realisation that the above problems may be alleviated by forming a weldable titanium wire produced from titanium sponge by processing solely in the solid state without melting occurring to any of the constituents at any time during processing.

Thus in a first aspect, the present invention relates to a method for producing a weldable wire or strip of titanium or alloyed titanium, wherein the method comprises:
  placing one or more particles of titanium sponge into the chamber of an uniaxial press, cold compacting the sample of particulate material in ambient air atmosphere to form a billet, heating the billet up to a temperature in the range from 400-1000° C., place the heated billet into the die of a preheated hot-extruder press and extrude a bar or profile of the billet at a temperature in the range from 400-1000° C., remove surface contaminants from the extruded bar or profile, and place the extruded bar or profile in a roller mill with one or more rolls placed in series to form the weldable strip or wire with the desired diameter.

The current invention describes a method and product derived from using commercially available titanium sponge, i.e. Kroll titanium sponge, without prior modification of the sponge particles, to produce titanium wire feedstock in a manner requiring substantially fewer processing steps and giving greater flexibility in final wire composition. Furthermore, the current invention produces a weldable wire that, when melted and built into a component using additive manufacturing, exhibits a chemical composition and mechanical properties comparable to conventional weld wire.

The invention may employ any known titanium sponge, and the particles of titanium sponge may advantageously be made by crushing and shearing of larger pieces of titanium sponge. The particles may have a particle size fraction in any range beginning with one of 1, 2, 3, 4, and 5 mm and ending with one of 10, 15, 20, 25, 30, 35, 40, 45, 50, 55, 60, 65, 70, 75, 80, 85, 90, 95, and 100 mm. Preferred ranges are a particle size fraction between 1-100 mm, between 2-50 mm, and between 3-25 mm. The term "particle size fraction" of a specified range as used herein is related to the mesh size of a grate being used to classify the particles, such that the particle size fraction with range of i.e. 1 to 100 mm is to be understood as particles with sizes large enough to not pass through a grate with mesh size 1 mm but small enough to pass through a grate with mesh size of 100 mm. One example of a suited sponge is magnesium-reduced, vacuum distilled titanium sponge satisfying the ASTM B299-07 specification [4]. This sponge has the advantage of having high commercial availability and low residual impurities levels. The inventive method may with commercial available titanium sponge of this quality obtain titanium wires containing less than 2500 ppm oxygen, 300 ppm N, 800 ppm C and 150 ppm H.

The cold compaction of titanium sponge may advantageously be performed in the following manner; Titanium sponge particles, without any additional processing or treatments such as sieving, regrinding, spherodizing or cleaning, and at room temperature, are poured into the chamber of a uniaxial press with the bottom of the container sealed to prevent the particles from falling through the press. Filling of the chamber is conducted in the presence of an ambient atmosphere as the use of inert, non-oxidizing purging gas (es) during cold compaction lead to gas entrapment between sponge particles in the compacted billet. The encapsulated inert gas results in final product porosity, as these gases exhibit zero solubility in titanium. No encapsulation of the titanium sponge billet is necessary as the starting constituents are of low magnesium, magnesium chloride and oxygen levels and compaction occurs at low temperatures, such as i.e. room temperature. Thus expensive canning and degassing operations are eliminated and the compacted billet can be handled in an identical manner to conventional titanium produced from the mechanical working of cast ingots. The press ram is slowly lowered to allow air to escape from the porous billet as it is slowly compacted and densified. A titanium sponge billet of high density and negligible open, surface-breaking porosity may be produced in this manner. Higher densities are desirable as there are fewer internal voids and surface defects, although the press capacity limits the extent to which fully densification can be achieved. The compacted billet (hereafter referred to as "billet") is then ejected from the press. The invention is not tied to this specific example of cold compaction, the invention may employ any known or conceivable process for cold compaction of titanium sponge into a billet of high density and negligible open surface-breaking porosity.

The billet may advantageously be coated with a lubricant after pressing to aid the extrusion process. Any presently or future lubricant known to the skilled person to be suited for extruding titanium billets may be applied. One example of suited lubricant is glass.

The heating of the billet may advantageously be performed in an inert atmosphere, this may include every process step of which the billet is at a temperature above 400° C. The heating of the billet may be to any temperature in the range from 400 to 1000° C., but may advantageously be to a temperature within 100° C. of the beta transition temperature of the titanium.

The hot extrusion of the compacted titanium billet may be performed in the following manner. The billet may advantageously be coated with a glass lubricant to minimise wear of the extrusion die and uptake of atmospheric contaminants. The billet is heated, preferably in an inert or vacuum atmosphere, such that the entrapped oxygen and nitrogen originating from the cold compaction process are absorbed into the titanium matrix. This leads to the dissolution of internal porosity and eventual closing and fusion of internal pores.

From the maximum allowable interstitial content of the final wire product and the chemical analysis of the titanium sponge, a maximum pore size can be approximately calculated using the diffusivities of the entrapped air species (nitrogen, oxygen) at different temperatures and hold times. Given a hold time of i.e. one hour at 900° C., an air-filled pore of approximately 2 mm in diameter will be absorbed by the titanium billet during subsequent heating prior to extrusion. A set of calculations for a range of temperatures and holding times is summarised in Table 1, and the Table is shown graphically in FIG. 1.

TABLE 1

Calculated largest air-filled pore sizes (in metres) that will be absorbed during heating for various temperatures and heating durations.

| T (° C.) | T (K) | D (m2/s) | 1800 s | 3600 s | 5400 s | 7200 s | 18000 s |
|---|---|---|---|---|---|---|---|
| 500 | 773 | 1.93E−17 | 4.6E−07 | 6.5E−07 | 7.9E−07 | 9.1E−07 | 1.4E−06 |
| 550 | 823 | 1.15E−16 | 1.1E−06 | 1.6E−06 | 1.9E−06 | 2.2E−06 | 3.5E−06 |
| 600 | 873 | 5.63E−16 | 2.5E−06 | 3.5E−06 | 4.3E−06 | 4.9E−06 | 7.8E−06 |

TABLE 1-continued

Calculated largest air-filled pore sizes (in metres) that will be
absorbed during heating for various temperatures and heating durations.

| T (° C.) | T (K) | D (m2/s) | 1800 s | 3600 s | 5400 s | 7200 s | 18000 s |
|---|---|---|---|---|---|---|---|
| 650 | 923 | 2.31E−15 | 5.0E−06 | 7.1E−06 | 8.7E−06 | 1.0E−05 | 1.6E−05 |
| 700 | 973 | 8.22E−15 | 9.4E−06 | 1.3E−05 | 1.6E−05 | 1.9E−05 | 3.0E−05 |
| 750 | 1023 | 2.58E−14 | 1.7E−05 | 2.4E−05 | 2.9E−05 | 3.3E−05 | 5.3E−05 |
| 800 | 1073 | 7.28E−14 | 2.8E−05 | 4.0E−05 | 4.9E−05 | 5.6E−05 | 8.9E−05 |
| 850 | 1123 | 1.87E−13 | 4.5E−05 | 6.4E−05 | 7.8E−05 | 9.0E−05 | 0.0001 |
| 900 | 1173 | 1.76E−10 | 1.4E−03 | 0.0020 | 0.0024 | 0.0028 | 0.0044 |
| 950 | 1223 | 3.19E−10 | 1.9E−03 | 0.0026 | 0.0032 | 0.0037 | 0.0059 |
| 1000 | 1273 | 5.51E−10 | 2.4E−03 | 0.0034 | 0.0042 | 0.0049 | 0.0077 |
| 1050 | 1323 | 9.13E−10 | 3.1E−03 | 0.0044 | 0.0054 | 0.0063 | 0.0099 |
| 1100 | 1373 | 1.46E−09 | 4.0E−03 | 0.0056 | 0.0069 | 0.0079 | 0.0125 |
| 1150 | 1423 | 2.25E−09 | 4.9E−03 | 0.0070 | 0.0085 | 0.0099 | 0.0156 |
| 1200 | 1473 | 3.38E−09 | 6.0E−03 | 0.0085 | 0.0105 | 0.0121 | 0.0191 |
| 1250 | 1523 | 4.94E−09 | 7.3E−03 | 0.0103 | 0.0126 | 0.0146 | 0.0231 |
| 1300 | 1573 | 7.04E−09 | 8.7E−03 | 0.0123 | 0.0151 | 0.0174 | 0.0276 |
| 1350 | 1623 | 9.83E−09 | 1.0E−02 | 0.0146 | 0.0178 | 0.0206 | 0.0326 |
| 1400 | 1673 | 1.34E−08 | 1.2E−02 | 0.0170 | 0.0209 | 0.0241 | 0.0381 |

The pore sizes in Table 1 is calculated as follows:

$$P = \sqrt{6Dt}$$

P is pore size in meter, D is the mass diffusion coefficient in m²/s, and t is time in seconds. At temperatures below the beta transition temperature (882° C.), the mass diffusion coefficient is set to:

$$D_\alpha = 1.2 \cdot 10^{-4} e^{\left(\frac{-189326}{RT}\right)},$$

and above the beta transition temperature, the mass diffusion coefficient is set to:

$$D_\beta = 3.5 \cdot 10^{-4} e^{\left(\frac{-141419}{RT}\right)}.$$

The mass diffusion coefficients are obtained from R. J. Wasilewski and G. L. Kehl (1954), "DIFFUSION OF NITROGEN AND OXYGEN IN TITANIUM", *J. Inst. Metals*, Vol: 83, and is set equal to the nitrogen mass diffusion coefficient because nitrogen is most abundant in air and is known to diffuse more slowly than oxygen in titanium.

Heating of the compacted billet in an inert atmosphere is desirable to minimise atmospheric contamination, but not absolutely necessary if appropriate glass coatings are applied. The temperature of billet pre-heating is preferably near the beta transition temperature for the titanium billet, since the diffusion of oxygen and nitrogen are increased by nearly an order of magnitude in the higher temperature beta phase, relative to the lower temperature, alpha allotrope. Additionally, the increased density of the compacted billet relative to the starting sponge particles presents a significant diffusion barrier to the mass transport of gaseous impurities. In practice, this implies that the neither the starting temperature nor the exit temperature of the billet during extrusion should exceed 1000° C. The density of the extruded bar may be greater than 98%.

The billet should be transferred without delay to a preheated extrusion press chamber. Heating of the extrusion chamber and die is necessary to prevent rapid chilling of the titanium billet, which would lead to unnecessarily high extrusion pressures. The extrusion ram applies increasing force to the back end of the billet, leading to near-complete densification. With increasing pressure, the billet begins to flow through the extrusion die forming an extruded form such as bar or profile. The speed of the emerging extrusion form is proportional to the relative cross sectional areas of the billet and bar, also known as the extrusion ratio, and the extrusion press speed. The extrusion die must also have the correct inlet and outlet geometries to ensure the surface finish of the extruded titanium is free of defects. The extruded titanium may advantageously be cleaned of surface contaminants and coiled whilst warm to facilitate subsequent handling and storage.

The extruded material is then transferred into a rolling mill for reduction of diameter of the extrudate. Each pass through the rolls should advantageously impart an area reduction of 5-35%. The rolling process is repeated until the final size and shape of the wire are obtained. The rolling process may advantageously be performed in a continuous rolling mill with several rolls positioned in series such that the incoming feed is continuously and significantly the reduced in cross-sectional area.

The cross-section profile of the wire is determined by the size and shape of the grooves in the rolling mill and may vary during the course of rolling, for instance a four-, six- or eight-sided rod may be passed through rolls with a semicircle to produce a circular wire, and vice versa. Intermediate stress relief is performed by holding the wire in a heated furnace, preferably filled with inert gas, under conditions that promote sufficient re-crystallization, and subsequent softening, to occur. It is desirable that there is at least one rolling pass after this heat treatment prior to coiling the wire, in order to obtain sufficient stiffness in the wire product that it may be fed through commercial automatic welding wire feeders.

LIST OF FIGURES

Figure 2:
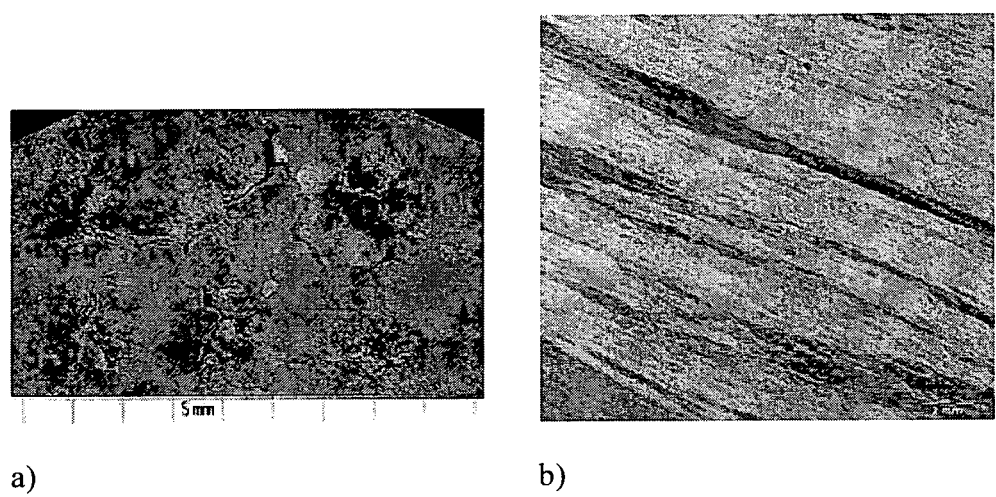

FIG. 1 shows calculated largest air-filled pore sizes (in meters) that will be absorbed during heating for various temperatures and heating durations FIG. 2 shows photographs of billet macrostructure. Photograph a) show the macrostructure prior to pre-heating and photograph b) shows after preheating.

VERIFICATION OF THE INVENTION

The invention will be described in further detail by way of examples of embodiments of the invention.

Example 3,5 kg of titanium sponge particles were transferred, in air, to a 100 mm container of a uniaxial hydraulic press. Approximately 1000 MPa was applied to compact the titanium sponge particles to a billet measuring approximately 100 mm in height, which corresponded to a density of 95%. This billet was subsequently coated in glass lubricant and placed in an argon-filled furnace at 900° C. for 60 minutes. FIGS. 2 a) and b) show the billet microstructure prior to and after heat treatment.

The heated billet was transferred to a uniaxial extrusion press and was extruded through an 18 mm aperture, giving an extrusion ratio of 22, at a constant press speed of 12 mm/s. The extruded rod was then passed through a series of rolling mills whereby the diameter was reduced in a primary rolling mill via the following intermediate diameters: 7, 6.5, 5.7, 5.1, 4.5, 4.1, 3.7, 3.4, 3 mm before secondary rolling through the following diameters: 2.83, 2.71, 2.52, 2.35, 2.15, 2.00, 1.83, 1.70, 1.61 and 1.50 mm to a final diameter of 1.6 mm. A stress relief between 4.1 and 3.7 mm was performed at 540° C. for 30 minutes.

The chemical composition of the as-produced wire was analysed and the impurity levels are reported in Table 2. To evaluate the weldability of this wire, it was subsequently melted by a TIG welding torch fitted with an inert gas trailing shield with flowing argon (22 L/min). Multiple weld beads were deposited to build up a solid form, which was subsequently sectioned for chemical analysis and mechanical testing. The non-melt consolidation of titanium sponge particles produced a weldable unalloyed titanium wire with acceptable chemical composition in comparison with conventional Grade 2 Commercial Purity (CP) Titanium wire both prior to, and as filler material in the weld, as shown in Table 2.

TABLE 2

Chemical composition of consolidated unalloyed wire and corresponding weld bead composition and mechanical properties.

| Chemical composition | Non-melt, unalloyed wire | Deposited shape | Conventional CP Grade 2 Ti wire |
|---|---|---|---|
| Element (wt %) | | | |
| Nitrogen | 0.011 | 0.027 | 0.03 max |
| Carbon | 0.025 | 0.013 | 0.08 max |
| Hydrogen | 0.0056 | 0.0039 | 0.015 max |
| Iron | <0.005 | 0.005 | 0.30 max |
| Oxygen | 0.12 | 0.12 | 0.25 max |
| Magnesium | 0.006 | Not detectable | 0.10 max |
| Titanium | Remainder | Remainder | Remainder |
| Mechanical Properties | | | |
| Tensile Strength (MPa) | — | 454 | 345 min |
| 0.2% Offset Yield | — | 370 | 275 min |
| Elongation (%) | — | 25.3 | 20 min |
| Element (wt %) | | | |
| Nitrogen | | | 0.03 max |
| Carbon | | | 0.08 max |
| Hydrogen | | | 0.015 max |
| Iron | | | 0.30 max |
| Oxygen | | | 0.25 max |
| Titanium | Remainder | Remainder | Remainder |
| Mechanical Properties | | | |
| Tensile Strength (MPa) | — | | 345 min |
| 0.2% Offset Yield | — | | 275 min |
| Elongation (%) | — | | 20 min |

REFERENCES

1. "Titanium: Past, Present and Future", Publication NMAB-392, National Academy Press, Washington, D.C., 1983
2. O. M. Ivasishin, "Cost-Effective Manufacturing of Titanium Parts with Powder Metallurgy Approach", Materials Forum, Vol. 29 (2005), pp. 1-8
3. R. Wilson, N. Stone, & M. Gibson, "Extrusion of CP Grade Titanium Powders Eliminating the Need for Hot Pre-Compaction Via Hot Isostatic Pressing", Materials Science Forum, Vols 534-536 (2007) pp. 801-804
4. ASTM standard B299-07, 2007, "Standard Specification for Titanium Sponge", ASTM International, West Conshohocken, Pa., 2007, DOI: 10.1520/B0299-07.

The invention claimed is:

1. Method for producing a weldable wire or strip of titanium, wherein the method consists of:
   placing one or more particles of titanium sponge into the chamber of an uniaxial press, cold compacting the sample of particulate material in ambient air atmosphere to form a billet,
   heating the billet up to a temperature in the range from 400-1000° C.,
   place the heated billet into the die of a preheated hot-extruder press and extrude a bar or profile of the billet at a temperature in the range from 400-1000° C.,
   remove surface contaminants from the extruded bar or profile, and
   place the extruded bar or profile in a roller mill with one or more rolls placed in series to form the weldable strip or wire with the desired diameter.

2. Method according to claim 1, wherein the particles of titanium sponge is crushed and sheared titanium sponge of magnesium reduced, vacuum distilled titanium sponge satisfying the ASTM standard B299-07.

3. Method according to claim 2, wherein the crushed and sheared titanium sponge has a particle size fraction between 1-100 mm.

4. Method according to claim 1, wherein the cold compacting of the sample of particulate material is performed at room temperature with a compacting pressure applied to the sample from 200 to 600 MPa.

5. Method according to claim 2, wherein the cold compacting of the sample of particulate material is performed at room temperature with a compacting pressure applied to the sample from 200 to 600 MPa.

6. Method according to claim 3, wherein the cold compacting of the sample of particulate material is performed at room temperature with a compacting pressure applied to the sample from 200 to 600 MPa.

7. Method according to claim 4, wherein the compacting is continued until the particulate sample is consolidated to a solid compact billet of greater than 80% density and which is substantially free of interconnected, surface-breaking porosity and has internal pores filled by air.

8. Method according to claim 4, wherein the pressed billet is coated with a lubricant.

9. Method according to claim 8, wherein the lubricant coating is glass and that the heating of the billet is made in an inert atmosphere.

10. Method according to claim 9, wherein the heating of the billet is regulated to give a temperature within 100° C. from the beta transition temperature of the titanium.

11. Method according to claim 4, wherein each pass through the rolls of the roller mill reduces the diameter of the rolled weldable strip or wire from 5 to 35%.

12. Method according to claim 4, wherein the starting temperature of the billet during extrusion does not exceed 1000° C.

13. Method according to claim 4, wherein the exit temperature of the extrudate bar does not exceed 1000° C.

14. Method according to claim 12, wherein the extruded bar has a density greater than 98%.

15. Method according to claim 13, wherein the extruded bar has a density greater than 98%.

16. Method according to claim 2, wherein the crushed and sheared titanium sponge has a particle size fraction between 2-50 mm.

17. Method according to claim 2, wherein the crushed and sheared titanium sponge has a particle size fraction between 3-25 mm.

18. Method for producing a weldable wire or strip of titanium, wherein the method consists of:
    placing one or more particles of titanium sponge into the chamber of an uniaxial press, cold compacting the sample of particulate material in ambient air atmosphere to form a billet,
    heating the billet up to a temperature in the range from 400-1000° C.,
    place the heated billet into the die of a preheated hot-extruder press and extrude a bar or profile of the billet at a temperature in the range from 400-1000° C.,
    remove surface contaminants from the extruded bar or profile,
    place the extruded bar or profile in a roller mill with one or more rolls placed in series to form the weldable strip or wire with the desired diameter, and
    heating the rolled wire in an inert atmosphere to obtain a stress relief at temperature where the titanium or alloyed titanium becomes softened.

\* \* \* \* \*